No. 731,728. PATENTED JUNE 23, 1903.
W. W. WORD.
APPARATUS FOR SHAPING AND SHARPENING ROCK DRILLS.
APPLICATION FILED SEPT. 24, 1902.
NO MODEL. 3 SHEETS—SHEET 1.
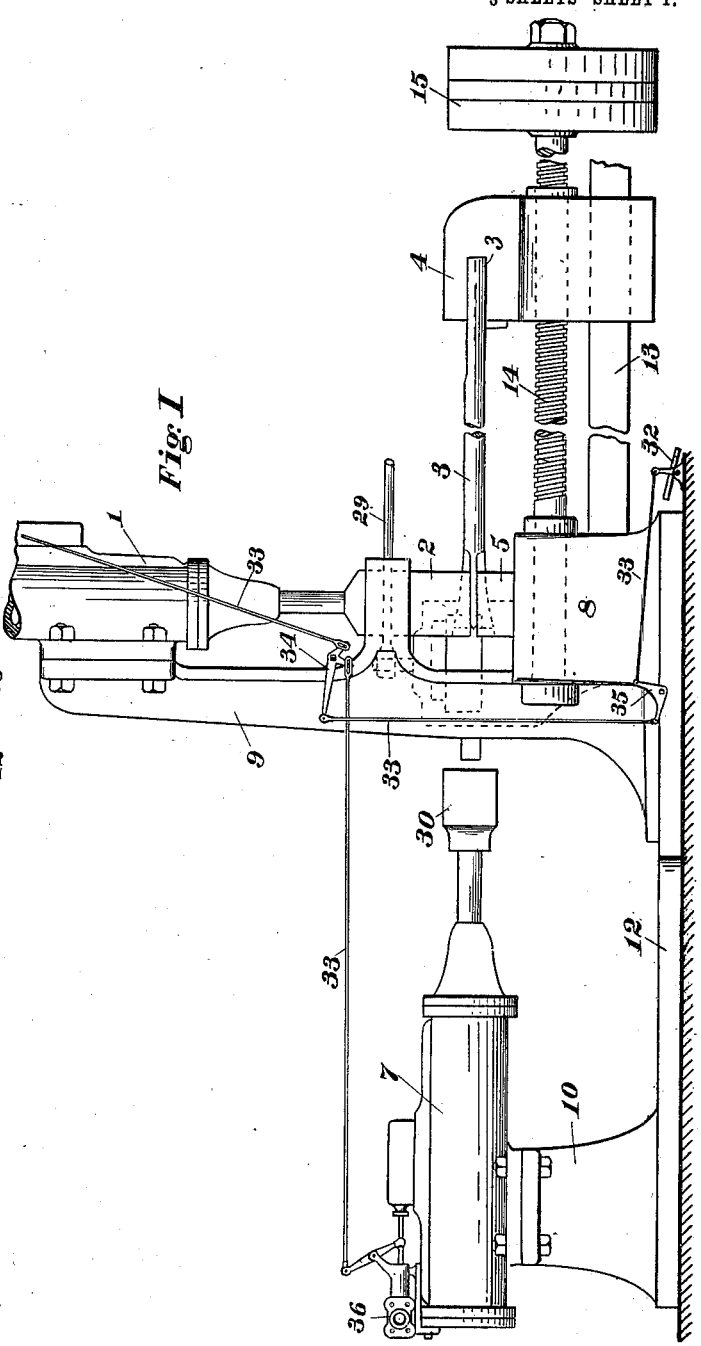
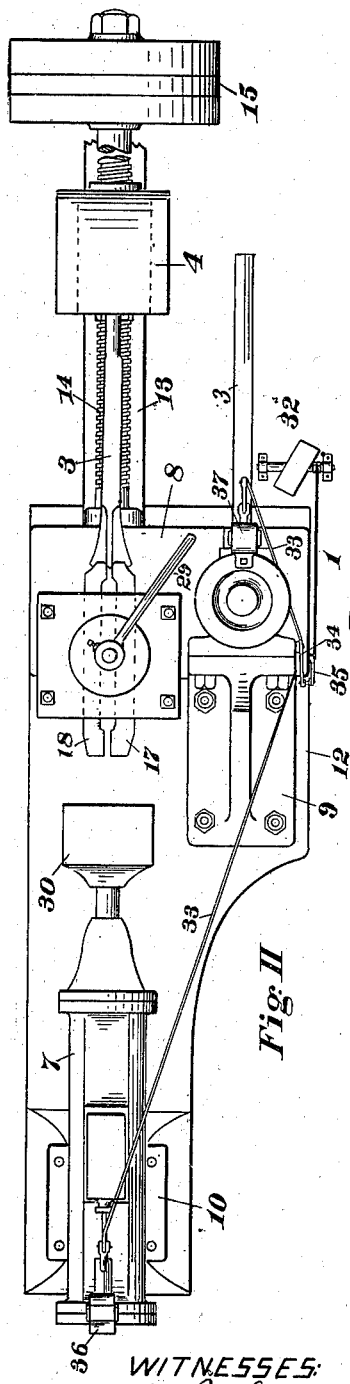
WITNESSES:
P. W. J. Lander.
E. Sandison
INVENTOR:
William W. Word,
By J. Richards & Co.
Attys.

No. 731,728. PATENTED JUNE 23, 1903.
W. W. WORD.
APPARATUS FOR SHAPING AND SHARPENING ROCK DRILLS.
APPLICATION FILED SEPT. 24, 1902.
NO MODEL. 3 SHEETS—SHEET 2.
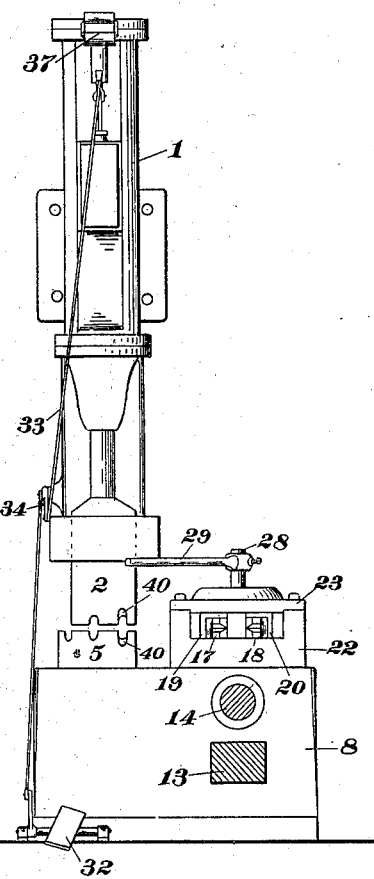
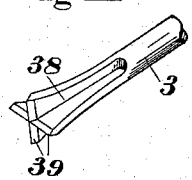
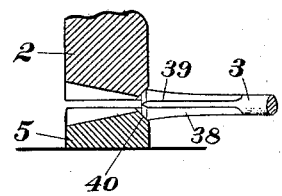
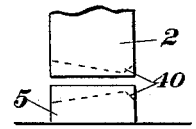
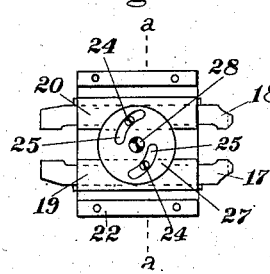
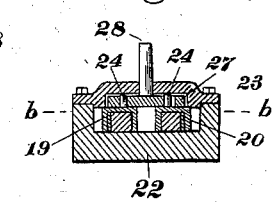
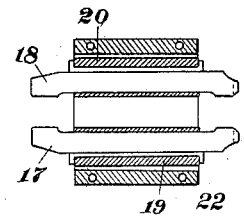
WITNESSES:
P. W. J. Lander,
E. Sandison
INVENTOR:
William W. Word,
By J. Richards & Co.
Attys.

No. 731,728. PATENTED JUNE 23, 1903.
W. W. WORD.
APPARATUS FOR SHAPING AND SHARPENING ROCK DRILLS.
APPLICATION FILED SEPT. 24, 1902.
NO MODEL. 3 SHEETS—SHEET 3.
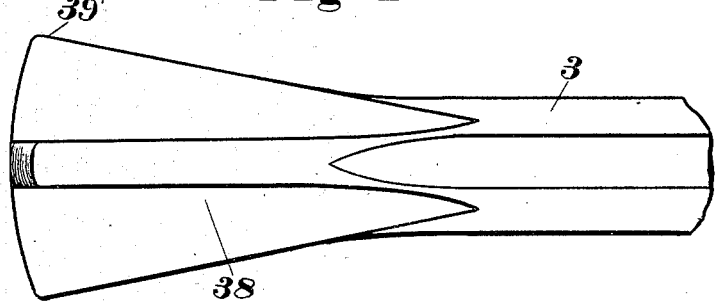
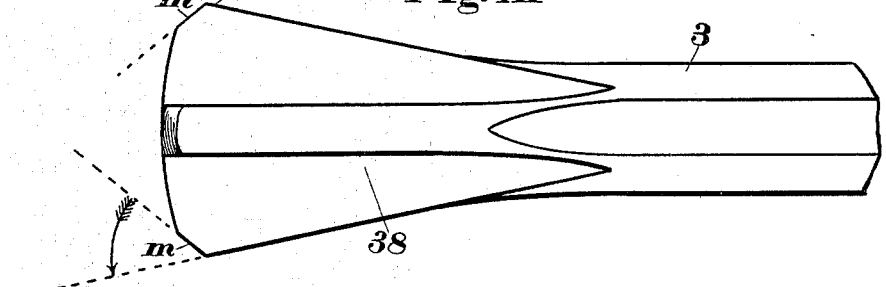
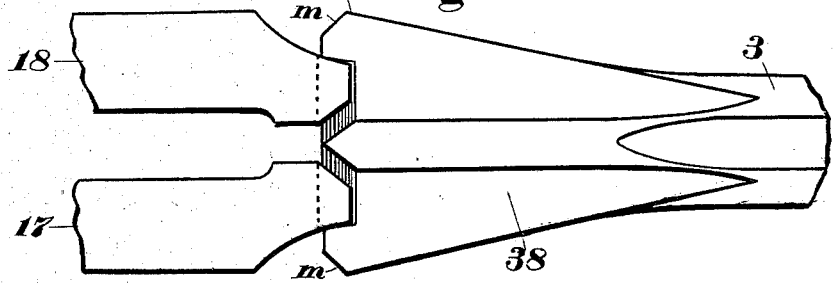
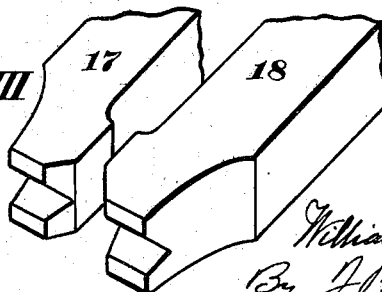

No. 731,728. Patented June 23, 1903.

UNITED STATES PATENT OFFICE.

WILLIAM W. WORD, OF LATROBE, CALIFORNIA, ASSIGNOR TO WORD MANUFACTURING COMPANY, A CORPORATION OF ARIZONA TERRITORY.

APPARATUS FOR SHAPING AND SHARPENING ROCK-DRILLS.

SPECIFICATION forming part of Letters Patent No. 731,728, dated June 23, 1903.

Application filed September 24, 1902. Serial No. 124,705. (No model.)

*To all whom it may concern:*

Be it known that I, WILLIAM W. WORD, a citizen of the United States, residing at Latrobe, county of Eldorado, and State of California, have invented certain new and useful Improvements in Apparatus for Shaping and Sharpening Rock-Drills; and I hereby declare the following to be a full, clear, and exact description of the same, reference being had to the accompanying drawings, forming a part of this specification.

My invention relates to apparatus for shaping and sharpening rock-drills by means of a machine and positively-acting devices that produce a correct and uniform shape of the cutting edges, as hereinafter particularly described, and illustrated by drawings that form a part of this specification.

My improvements consist in reciprocating hammers, acting, preferably, at different angles, that indent or form the wings and upset and form the face or cutting edges of the drills by means of interposed laterally-movable dollies and dies to act upon and swage the cutting ends of drills of any size without changing the dies or substituting other working parts, also means to full the cutting-corners by turning a portion of the metal ninety degrees to supply displacement, means to support and adjust the drill-stems, and in other constructive and operative features hereinafter fully pointed out and explained by the aid of the drawings and the characters of reference thereon.

The objects of my invention are to secure a rapid and accurate result in shaping and sharpening rock-drills of any size without changing the forming-dies, also securing a uniform shape by means that dispense with the skill and expense required in hand-work.

Referring to the drawings, Figure I is a side elevation of a machine for shaping and sharpening rock-drills constructed according to my invention. Fig. II is a plan view of Fig. I. Fig. III is a front elevation of the same machine; Fig. IV, a side view of the dies for lateral swaging; Fig. V, a vertical section through Fig. IV. Fig. VI is a plan view of the laterally-movable dollies for shaping the edges of the drill and cam to move the same. Fig. VII is a transverse section through Fig. VI on the line $a\,a$. Fig. VIII is a horizontal section through Fig. VII on the line $b\,b$. Fig. IX is a view in perspective of a finished drill end. Figs. X, XI, and XII are enlarged views of the cutting end of the drill in the different stages of its preparation. Fig. XIII is an enlarged view in perspective of the operating ends of the dollies that form the cutting edges, as hereinafter explained.

Referring first to Figs. I and II, 1 is a reciprocating hammer with a heavy movable die or head 2, that has an indented matrix corresponding to a like matrix in the bottom die 5, on which the end of the drill 3 rests, as shown in Fig. I.

7 is a hammer with horizontal movement to act on the end of the drill 3.

8 is an anvil, 9 and 10 supports for the hammers 1 and 7, and 12 a sole-plate on which the various parts are supported.

The anvil 4, by which the rear end of the drill 3 is supported, is made massive to absorb by its inertia the concussion when the hammer 7 is operating on the ends of the drills, as shown in Fig. II. It slides on a strong guiding-bar 13 and is moved outward and inward to suit the length of the drills 3 by means of a screw 14, preferably driven by power applied to the pulleys 15, that can be driven right or left in the usual manner.

Between the end of the drill 3 and the die 30 of hammer 7 is interposed the dollies 17 and 18, that form the cruciform cutting edges. (Shown in Figs. IX and XII.) These dollies 17 and 18 form an important part of my invention, as it is by their action on a part of the drill edges at a time that drills of any size can be sharpened or dressed on the machine without changing the dies or other parts. They also by their "fulling" effect in working from the center outward turn over the beveled portion $m$, so that it becomes a part of the side of the wings, and this supplies at the extreme corners of the drill edges sufficient metal to give the complete and desired form to the cutting edges. These dollies are held in two open-bottom guides 19 and 20, that slide laterally in the anvil 22 beneath the covering-plate 23, as seen in Fig. VII.

On the top of the guide-boxes 19 20 are pins 24, that slide in curved slots 25 in the cam or disk 27. (Seen in Figs. VI and VII.) This cam-disk 27 fits into a recess in the covering-plate 23, as shown in Fig. VII, and is provided with a stem 28, that passes through this covering-plate to receive a handle 29, by means of which this disk is turned to move the guides 20 and the dollies 17 and 18 nearer together or farther apart for purposes hereinafter explained.

The die or head 30 of the hammer 7 is made wide enough to impinge on the heads of both the dollies 17 and 18 when fully expanded, as in Fig. VIII, and the acting ends of these latter are made narrow, as shown in Figs. III and VIII, so as to draw the metal laterally away from the center and not pull or stove it, as would be the case if the dies or matrices were as wide as the length of the edges acted upon.

The hammers 1 and 7 can be operated by air or steam or by mechanical gearing, but preferably by air, and are stopped and started by valves in the usual manner, the latter being operated by an oscillating pedal 32, connected by rods 33 and bell-cranks 34 and 35 to the valves 36 37, the movement of which in opposite directions starts or stops the hammers 1 and 7 alternately one at a time, as governed by the range of movement of the pedal.

In operating the hammer 1 is set in motion, and the bar or blank 3 is inserted between the dies 2 and 5, which by a proper configuration and at one or more operations reduce the end to a cruciform section, as indicated in Fig. X.

In operating the action of the vertically-acting hammer 1 reduces the end of the drill-bar 3 to the form indicated by Fig. X, the redundancy of the metal at the center giving a curved contour shortened at the corners, as seen at 39'. To recover this metal and produce full corners, the drill end is inserted in the short beveled cavities 40 of the dies 2 and 5. This produces the form shown in Fig. XI, seemingly wrong; but when the drill is shifted to receive the action of the hammer 7 and the dollies 17 and 18 (shown in Fig. XIII) the metal is driven from the center outward, and the beveled portion $m$ is turned out by the spreading of the dollies to form a portion of the outer line of the wings 39. This latter-named operation is an important feature in my invention and one without which the sharpening or end-reducing process would fail to produce the desired form of the edges. After finishing the processes described the drill is placed against the anvil 4, the hammer 7 is set in motion, and the dollies 17 and 18, being in the position shown in Fig II or near together, are driven against the end of the drill near the center, giving shape there to the cutting edges, their forward ends being channeled to correspond to the V-shaped cutting edges of the tool, as shown in Fig. IX at 39, the bottom of said channel being indicated by dotted lines at the ends of the dollies, Figs. VI and VIII. Then while acting the dollies are moved laterally and outward by means of the handle 29 and other devices, as before described, and the metal is drawn to some extent outward from the center and the corners of the wings 39 are turned from the position indicated in Fig. XII, thereby replenishing the deficient part of the metal, then permitting the front or cutting edges to become straight, producing the finished form shown in Fig. IX. The drill after being treated in one plane is turned one-fourth way, or ninety degrees, the dollies 17 and 18 are moved to the center, as before, and the other edge is completed at a right angle to and in the same manner as the first, producing the completed form, as seen in Fig. IX.

The valve connections to stop and start the hammers, gearing to move the anvil 4, also other supplementary parts can be modified to suit the circumstances of erection and use. I do not, therefore, claim a specific construction of these in my present application; but What I do claim, and desire to secure by Letters Patent, is—

1. In drill-shaping apparatus, a horizontally-acting hammer with die-head, intermediate spreading dollies for operating on the cutting end of the drill, a movable anvil at the opposite end of the drill for taking up the blows of the said hammer and die-head, and means for mechanically adjusting and locking the position of said anvil, substantially as specified.

2. In drill-shaping apparatus, a horizontally-acting hammer with die-head, means for supporting the drill, an adjustable anvil abutting against the opposite end of the drill, laterally-movable dollies for forming the ends of the cruciform portion of the drill, between said anvil and die-head, both in the path of the die-head, and means for opening and closing the movable dollies, substantially as specified.

3. In drill-shaping apparatus, two parallel laterally-movable dollies, having at their forward ends matrices to form the cutting edges of the drill, means to spread and close the dollies laterally while in use, in combination with a horizontally-operating hammer and die-head for acting on the end of the drill, said die-head encountering both dollies, substantially as specified.

4. In drill-shaping apparatus, two parallel laterally-movable dollies embracing the drill on each side, having at their forward ends matrices to form the cutting edges of the drill, movable guide-boxes inclosing said dollies, means for simultaneously spreading and closing said guide-boxes and dollies while in operation, and a horizontally-operating hammer and die-head for acting on the cutting end of the drill, said die-head encountering both dollies, substantially as specified.

5. In drill-shaping apparatus, two parallel laterally-movable dollies embracing the drill on each side, having at their forward ends matrices to form the cutting edges of the drill, movable guide-boxes inclosing said dollies, means for simultaneously spreading and closing said guide-boxes and dollies while in operation, a horizontally-operating hammer and die-head for acting on the cutting end of the drill, said die-head encountering both dollies, and a mechanically-adjustable anvil opposed to said hammer and die-head at the other end of the drill, substantially as specified.

In testimony whereof I have signed my name to this specification in the presence of two subscribing witnesses.

WILLIAM W. WORD.

Witnesses:
J. B. WORD,
ALFRED A. ENQUIST.